P. A. FOGARTY & D. McGOEN.
FILTER.

No. 174,795. Patented March 14, 1876.

UNITED STATES PATENT OFFICE.

PATRICK A. FOGARTY, OF NEW YORK, AND DOMINICK McGOEN, OF BROOKLYN, N. Y.

IMPROVEMENT IN FILTERS.

Specification forming part of Letters Patent No. 174,795, dated March 14, 1875; application filed July 24, 1875.

*To all whom it may concern:*

Be it known that we, PATRICK A. FOGARTY, of the city, county, and State of New York, and DOMINICK McGOEN, of Brooklyn, in the county of Kings and State of New York, have invented an Improvement in Filters; and we do hereby declare the following is a full, clear, and exact description of the same, reference being had to the accompanying drawing, which forms part of this specification.

Our invention relates to an improved apparatus for filtering liquids through charcoal or other filtering material under pressure; and the object of the invention is to prevent the liquid from cutting channels in the filtering material, or escaping outside thereof, down the sides of the vessel, without being properly filtered.

The invention consists in a novel combination of devices whereby the upper distributer, by which the liquid to be filtered is distributed among the filtering material, is also made to operate as a follower, to compress and pack the filtering material, and insure the uniform filtering of the liquid.

Figure 1:
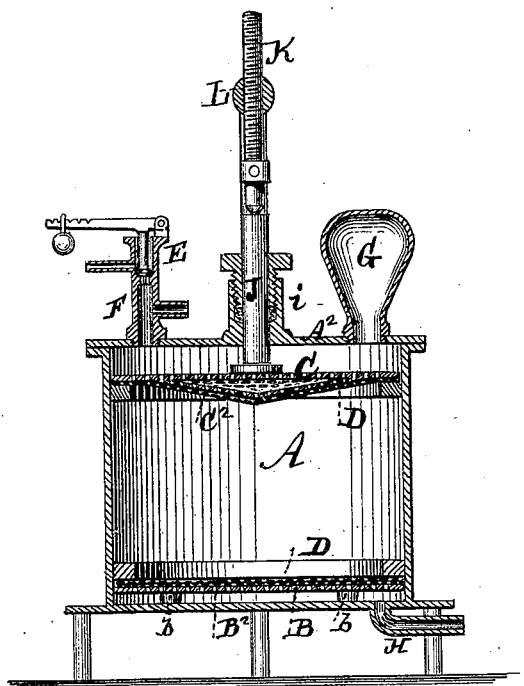
Figure 2:
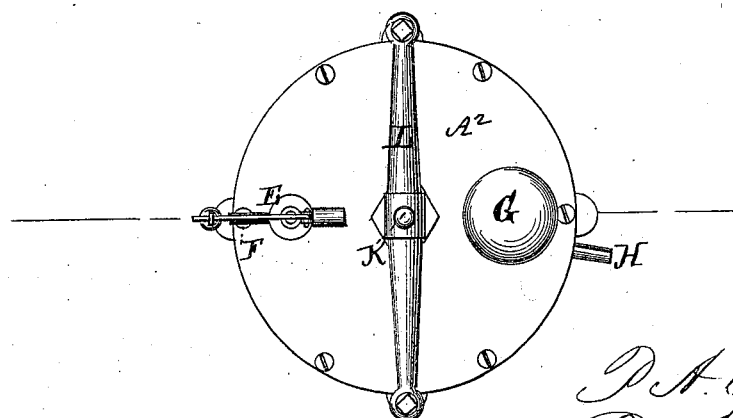

In the accompanying drawing, Figure 1 is a vertical sectional view of a filtering apparatus embodying our invention. Fig. 2 is a top view of the same.

A represents a filtering chamber or vessel, of any suitable construction, for holding animal charcoal or other filtering material. On the bottom of the vessel A, supported by feet $b$, rests the false bottom or lower distributer, consisting of perforated plate B, on the top of which lies one or more layers of wire-gauze, $B^2$. In the upper part of the vessel A is the upper distributer C, consisting of a perforated double plate, the upper side of which is a plane surface, and the lower side conical or convex, with a layer of wire-gauze, $C^2$, between said conical surface and the upper surface of the filtering material in the vessel A. Over the lower distributer, and under the upper distributer, are packing-rings D, of rubber or other suitable elastic material, which fit closely against the interior surface of the vessel A, and prevent the escape of liquid between said rings and the sides of the vessel. The lid $A^2$ of the chamber or vessel A is provided with an air-chamber, G, and also with a safety-valve, E, communicating with the induction-pipe F, and the bottom of the vessel A is provided with an eduction-pipe, H, for carrying off the liquid after it is filtered. In the center of the lid $A^2$ is a stuffing-box, $i$, through which passes a stem, J, the lower end of which bears against the center of the upper surface of the upper distributer, and may, if desired, be made wider or of greater diameter than the rest of the stem, in order to give it a broader bearing, and prevent injury to the distributer. On the upper end of the stem J bears the point of a screw, K, which works in a cross-head, L, the ends of which are attached to standards, so as to form a yoke—the screw being provided with suitable means for turning it.

The liquid to be filtered is introduced, and the pressure is applied, in the usual or any suitable manner. The screw K is turned so as to cause the stem J to bear with great force upon the upper distributer, and cause it to operate as a follower, and pack and compress the filtering material so as to prevent the liquid from cutting channels therein, or escaping through the same and running down the sides of the vessel A without being properly filtered. As the filtering material becomes saturated with the liquid, and the liability to form channels therein increases, the screw is again turned so as to press down the follower, and the operation is repeated as often as may be found necessary, so as to pack and compress the filtering material, and prevent the liquid from escaping therefrom, except by thoroughly percolating through the same, by which means the thorough and uniform filtering of the liquid is insured.

What we claim as new, and desire to secure by Letters Patent, is—

In a filtering apparatus the upper filter and distributer C, constructed of a perforated, double plate, the upper side of which is a plane surface and the lower side conical, and provided with a packing material, D, around its edge, in combination with the vessel A, stem J, stuffing-box $i$, screw $k$, and cross-head L, all substantially as shown and described, for the object set forth.

P. A. FOGARTY.
      DOMINICK McGOEN.

Witnesses:
 FRED. HAYNES,
 FERD TUSCH.